June 6, 1939.  G. E. WESTBERG ET AL  2,161,553
MEANS OF CONVEYING AND MIXING COMMINUTED MATERIAL
Filed Sept. 30, 1935  3 Sheets-Sheet 2
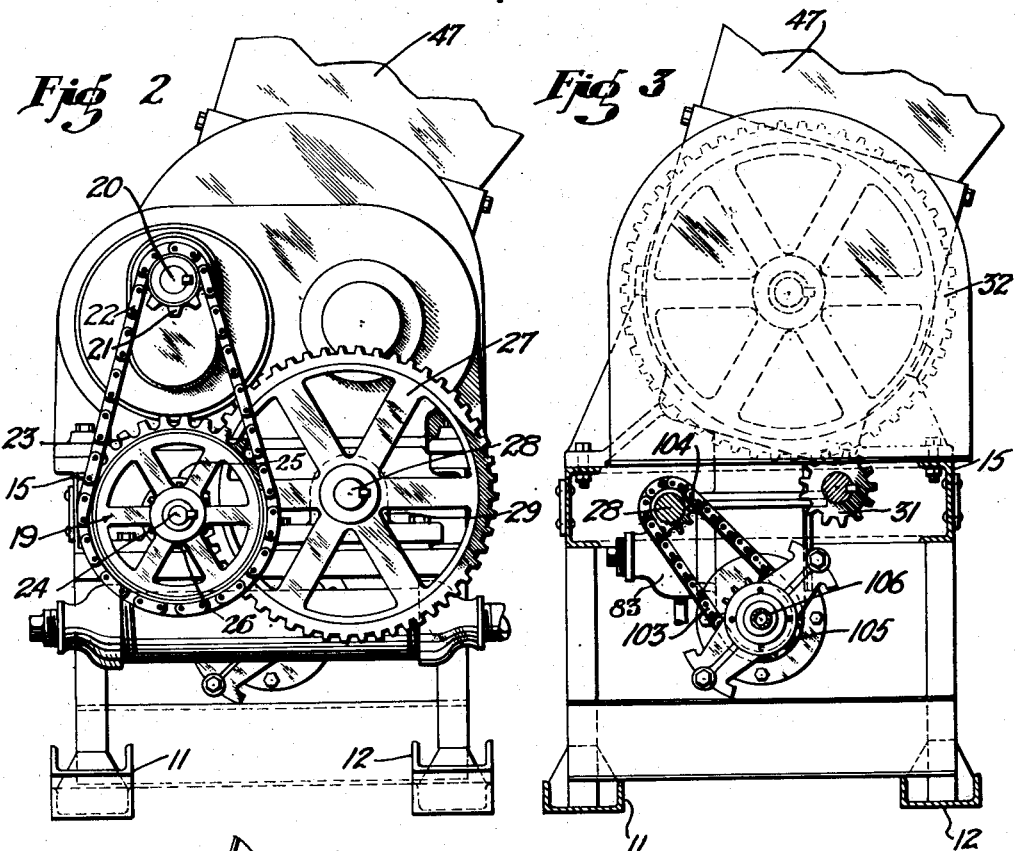
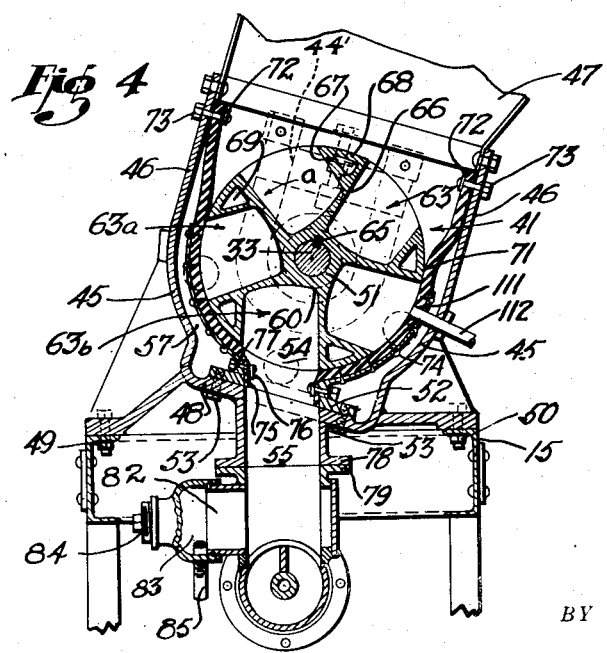
INVENTOR
HARRY WESTBERG
GUSTAVE E. WESTBERG
BY James M. Abbett
ATTORNEY June 6, 1939.  G. E. WESTBERG ET AL  2,161,553
MEANS OF CONVEYING AND MIXING COMMINUTED MATERIAL
Filed Sept. 30, 1935   3 Sheets—Sheet 3
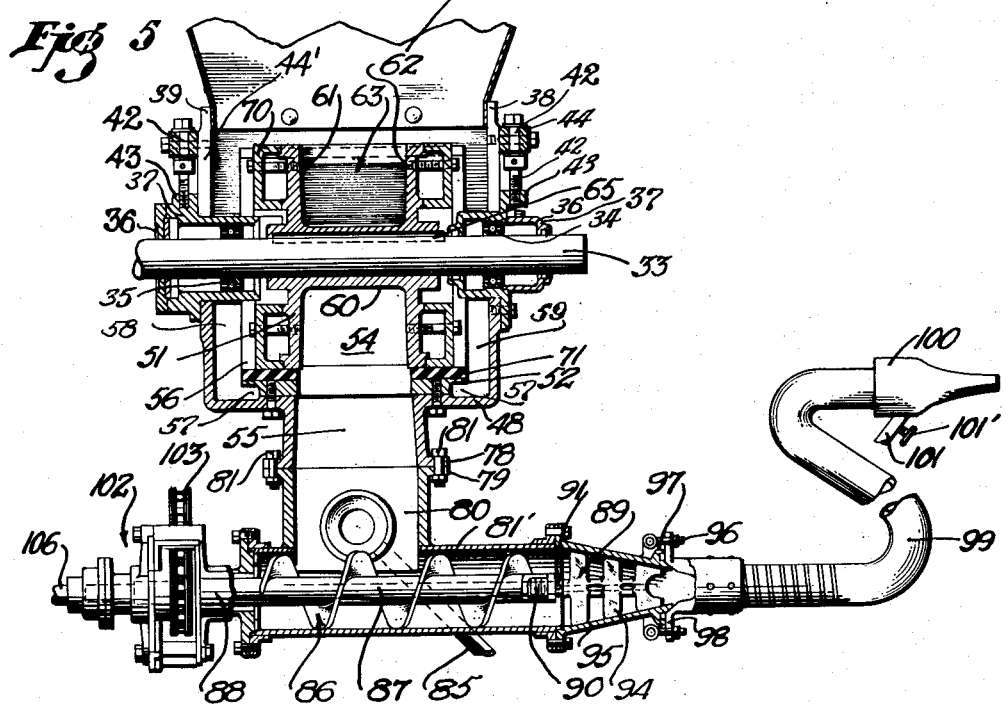
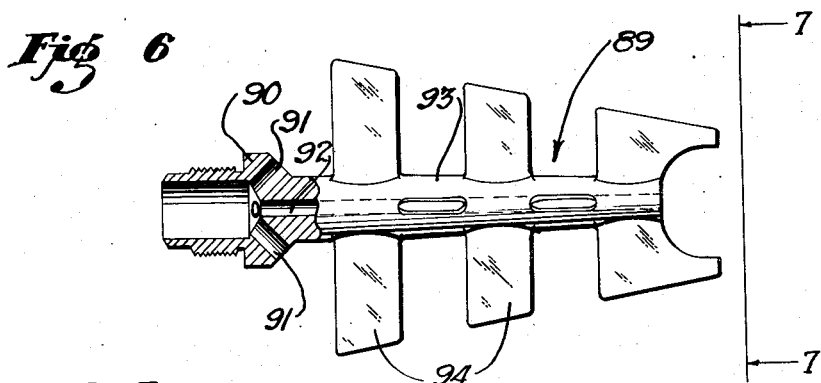
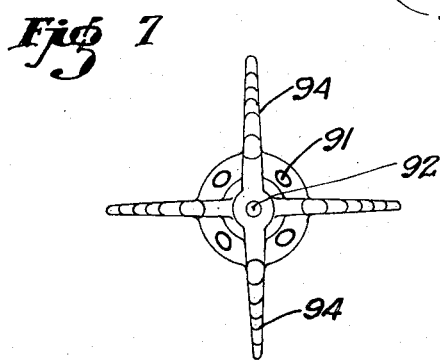
INVENTOR
HARRY WESTBERG
GUSTAVE E. WESTBERG
BY James M. Abbott
ATTORNEY Patented June 6, 1939

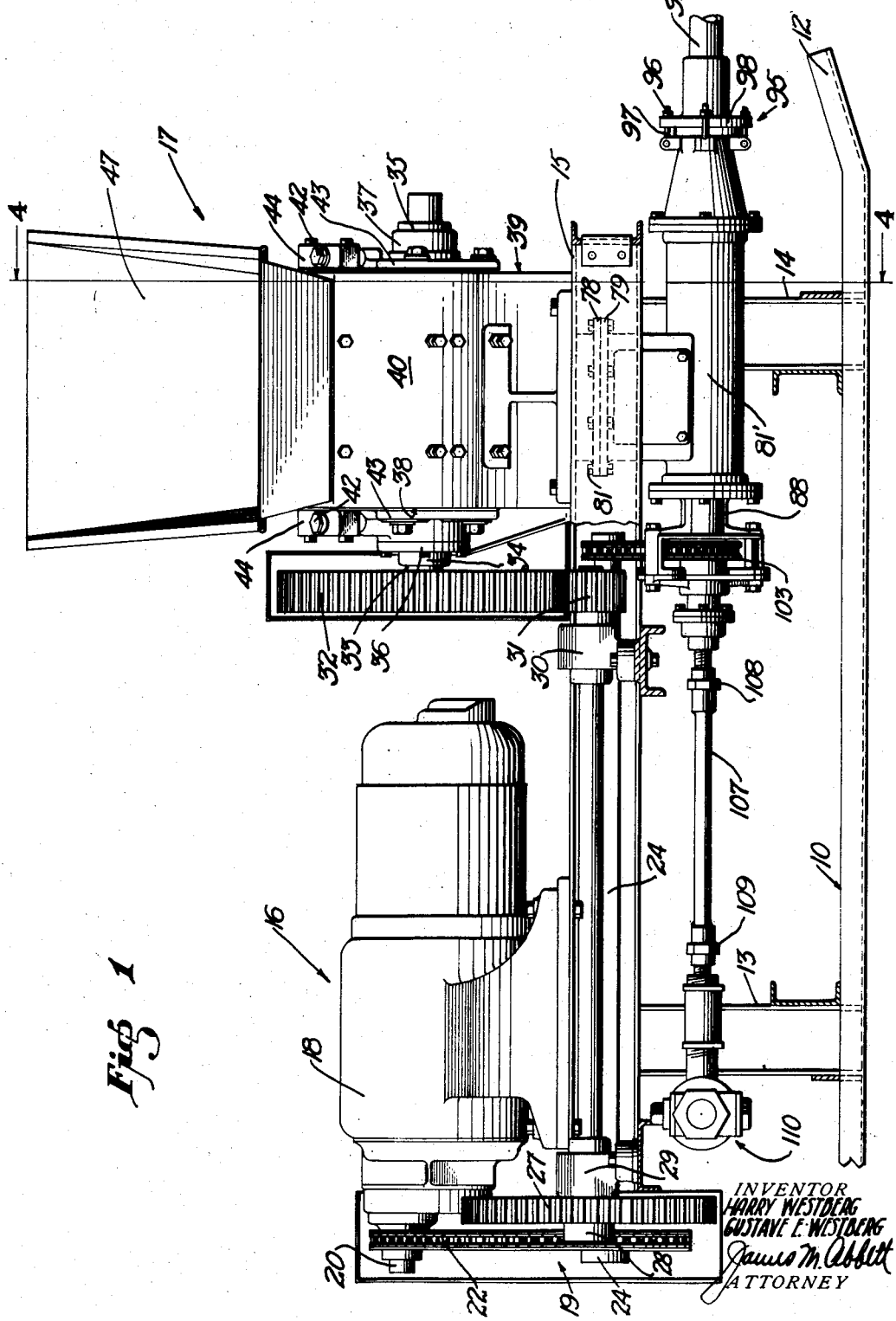

2,161,553

UNITED STATES PATENT OFFICE 2,161,553

MEANS OF CONVEYING AND MIXING COMMINUTED MATERIAL

Gustave Edward Westberg and Harry Westberg, Los Angeles, Calif.

Application September 30, 1935, Serial No. 42,873

2 Claims. (Cl. 259—151)

This invention relates to a means of conveying and mixing comminuted material, and particularly pertains to a cement gun of the type generally indicated in a patent entitled Concrete conveying and mixing machine, issued to Harry Westberg and Lawrence E. McCormack as joint inventors under date of April 3, 1934, Patent No. 1,953,091.

In the construction of various types of building structures, tunnel linings, and the like, it is desirable to place cementitious materials at points remote to that at which the solid materials are mixed or introduced, and to convey the materials in a manner to insure that after they have been delivered to the point of discharge from the apparatus they will be properly hydrated and will be placed by the application of fluid pressure to produce an accumulated mass of hydrated cementitious material, compactly filling a form, or applying it to a surface to build a wall of desired thickness, compactness, and strength. The present invention relates in a general way to a method and apparatus by which plastic material, such as hydraulic cement or other cementitious mixtures, may be applied to walls or other surfaces, and to structures designed to be formed integrally therewith, and more particularly the present invention relates to means whereby the cementitious material is transported from a point remote to a point adjacent to the work to be performed, said invention including means whereby the cementitious mixture will be maintained in a suspended condition within a pneumatic pressure fluid.

Heretofore most of the systems of placing cementitious materials by pneumatic means have been carried out with "batch" machines; that is to say, separate charges of cementitious material have been consecutively introduced into the feed conduit and transmitted therethrough by pneumatic pressure. In such apparatus it is necessary to initiate pneumatic pressure upon the mass of cementitious material within the pressure chamber, the pressure being of sufficient magnitude to force the material into the conduit and then to cause it to move therealong by the action of the pneumatic pressure against a mass of material. This results in a diminished pressure within the conduit when the feed operation is started and afterwards a change of pressure when all of the material has been forced into the conduit and is being conveyed therealong. The result has been that even though a plurality of pressure feed chambers have been provided and are controlled with such precision as to cause the feed operations from the different chambers to follow each other in close sequence, it has been found in practice that there is not a continuous pneumatic pressure prevailing in the apparatus and its feed line, but, in fact, a pulsating pressure which prevents the possibility of obtaining a continuous and uniform feed of material and in applying it to the work under a continuous and uniform pressure. An object of the present invention is, therefore, to provide a method and means whereby materials will be fed constantly, will be acted upon by a continuous pneumatic pressure fluid, and will be conveyed through the machine without pulsation or variation in the dispersion of the materials within the apparatus and the conduit, and to insure that a continuous and constant fluid pressure and a continuous and constant degree of dispersion of the particles of the materials throughout the entire system will be maintained.

It is the principal object of the present invention, therefore, to provide a method and means for creating an initial suspension of a dry cementitious mix by the action of fluid pressure, the magnitude of which fluid pressure is directly related to the size, weight, and quantity of material utilized in contemplation of the necessary predetermined pressure whereby such fluid suspension may be obtained. In this connection it should be said that experience has taught that ordinary fine cementitious mixtures may be properly suspended under pneumatic pressure of approximately forty-five pounds, or in other words, three atmospheres, and according to the disclosure made in the following specification and the accompanying drawings it will be apparent that this fluid suspension of finely divided particles will be maintained until the particles are hydrated at the discharge nozzle.

A general object of the present invention is to provide means whereby air is delivered to a dispersing chamber whereby air under pressure is introduced into an expansion chamber, the closed end of which chamber is hemispherical with relation to the longitudinal axis thereof, and which chamber communicates with a cementitious material dispersion chamber into which finely divided cementitious particles are introduced, and where they are agitated to become dispersed throughout the volume of air to be mechanically suspended and carried in the air in a manner to be obtained by the action of a gyratory column of air under predetermined pressure passing from the expansion chamber into the path of the cementitious materials within the dispersion chamber.

A specific object of the present invention is to provide a cementitious material induction valve, mechanical feed means, and fluid pressure ejecting means operating in agreed relationship to each other, and synchronized to meter the material fed to the mechanical feed means and ejected from the machine in a manner to insure that a predetermined dispersion and suspension of the solid particles of material will be created and maintained.

The present invention contemplates the provision of an apparatus which includes a hopper into which cementitious materials are delivered, such, for example, as proper proportions of sand and cement, and in communication with which hopper a dispersion chamber is provided to receive metered quantities of the materials from the hopper and to deliver said materials to a feed chamber from which the materials are ejected into and through a conduit by mechanical feed means having direct synchronism with the metered feed of the material, said feeding action being supplemented by the agitating and conveying action of fluid under pressure by which the metered material is dispersed, mechanically suspended, and transported into the feed chamber and then through the discharge conduit to a nozzle where the particles are hydrated and discharged.

The invention is illustrated by way of example in the accompanying drawings in which:

Figure 1 is a view in side elevation showing the complete machine with which the present invention is concerned.

Fig. 2 is a view in end elevation showing the driving mechanism of the present invention.

Fig. 3 is a view in end elevation showing the opposite end of the structure and the drive for the feed mechanism.

Fig. 4 is a view in transverse section through the feed hopper, the feed valve, the expansion dome, and the dispersion throat as seen on the line 4—4 of Fig. 1.

Fig. 5 is a view in vertical section showing the feed valve, the dispersion throat, the feed chamber, and the mechanical conveying means associated therewith.

Fig. 6 is a view in elevation with parts broken away showing the agitator.

Fig. 7 is a view of the agitator in end elevation.

Referring more particularly to the drawings, 10 indicates a sub frame here shown as including a pair of skids 11 and 12 upon which pairs of uprights 13 and 14 are mounted. Disposed upon the uprights is a frame structure including longitudinal frame members 15 on to which the machine with which the present invention is concerned may be mounted. The machine comprises a power unit 16 and a mixing and conveying unit 17. The power unit as here shown includes a driving motor 18 having a suitable gear reduction unit 19 driven therefrom and which unit in turn drives a shaft 20. The shaft 20 carries a sprocket pinion 21 around which a driving chain 22 is led, said chain also passing around a sprocket wheel 23. The sprocket wheel 23 is mounted upon a shaft 24 rotatably supported in suitable bearings 25 carried on the upper frame structure 15. A gear pinion 26 is keyed on to the shaft 24 and is in mesh with a relatively large diameter driven gear 27, which gear is mounted on a shaft 28 rotatably supported adjacent the gear within a journal box 29, and rotatably supported at its opposite end in a journal box 30. The journal boxes 29 and 30 are fastened on the frame structure 15. Secured upon the end of the shaft 28 is a pinion 31. This pinion in turn drives a gear 32 which is mounted upon a valve shaft 33. The valve shaft 33 is rotatably supported in a plane above that of the shaft 28 and is supported in bearings 34 and 35. These bearings are carried within bearing sleeves 36 and 37, respectively, which are in turn secured to the opposite end walls 38 and 39 of the valve housing 40 within which a rotary metering valve 41 is mounted. The bearing sleeves 36 and 37 are mounted for vertical adjustment by adjusting screws 42 engaging lugs 43 on the sleeves and extending upwardly through hangers 44 mounted upon the end walls 38 and 39. The bearing sleeves may be adjustably set in slotted end openings 44' of the end walls 38 and 39. The end walls 38 and 39 of the valve housing 40 are parallel to each other while the intervening side walls, as particularly shown in Fig. 4 of the drawings have semicircular lower portions 45 continuing upwardly in parallel portions 46, which as shown in Fig. 4, are disposed at an inclination to the vertical. The opened mouth of the valve housing 40 is fitted with a hopper 47 into which materials to be mixed and conveyed are deposited. The bottom of the valve housing 40 is formed with an inclined floor 48. The entire hopper is fastened to the frame structure 15 by bolting brackets 49 and 50. The valve housing 40 is provided with a rotor distributor member 51 which as particularly shown in Fig. 4 of the drawings, comprises a bolting pad 52 secured in position against the upper face of the wall 48 by cap screws 53. The bolting pad 52 continues upwardly in a throat 54 which is in register with a throat 55 formed as a downward continuation of the wall 48 of the valve housing 40. The throat portion 54 communicates with oppositely extending arcuate wall portions 56 which are concentric with the rotating axis of the valve shaft 33 and combine to form an arcuate false wall within the valve housing 40 and spaced therefrom as indicated at 57. This arcuate wall structure is open at its opposite ends and terminates short of the valve housing end walls 38 and 39 to form end spaces 58 and 59.

By reference to Fig. 5 of the drawings, it will be seen that the semi-circular false wall structure 56 overhangs the opposite ends of the bolting pad 52 and that they are spaced from the bottom wall 48 of the valve housing 40. Due to this arrangement it is possible to fill the spaces 57, 58, and 59, with wet sand and to maintain this sand in a moistened condition so that it will act as a packing for the rotary valve 41 which is mounted upon and keyed to the shaft 33. It will also be evident that the moisture of the sand will act as a lubricant between the surface of the rotary valve 41 and a packing pad 71 to be hereinafter described. The rotary valve acts to feed the finely divided material from the hopper 47 into the throat 55. This valve is cylindrical and is formed with a central portion 60 having opposite end walls 61 and 62 between which feed pockets 63 occur. The end walls 61 and 62 are cast integral with a hub 64 which is formed with a keyway to receive a key 65 by which the rotary valve is fixed to rotate with the valve shaft 33. Extending substantially radial from the hub 64 and between the end walls 61 and 62 of the rotary valve section 60 is a plurality of webs 66 which define the width of the pockets 63 while the end walls 61 and 62 define the length of these pockets. Attention is directed to the fact that the pockets do not extend exactly radially wih relation to the axis of shaft 33, but are arranged tangentially thereto at an angle sufficient to cause the side walls of a pocket to assume positions in vertical continuation of the side walls of the throat member 55 when discharging material therefrom. The shape of this pocket is produced in the manner described by providing an angularly disposed back face 67 for each of the webs 66 and parallel to the opposing face of an adjacent web. The portions 66 and 67 are connected by arcuate segments 68 which are concentric with the axis of rotation of the shaft 33. These segments combine with the web 66 and supplemental webs 67 to form triangular openings 69. Secured against the opposite outer end faces of the members 61 and 62 are drums 70 which are formed with an annular channel shaped space and supplement the rotary sections 61 to extend the cylindrical bearing surface of the rotor 41 to a point beyond the sides of the throat section 54. This provides a surface at each end for sealing the throat to prevent leakage of air delivered in a manner to be hereinafter described.

Carried by the arcuate wall sections 56 and secured by rivets 74 is a rubber packing pad 71 which extends beyond the upper edge of the wall sections 51 at each side of the rotor and is preferably secured to the wall portions 46 of the valve hopper 40 by cleats 72 and bolts 73. This sheet packing extends beyond the ends of the rotor assembly 41, as shown in Fig. 5, and is supported at said extending ends by the overhanging lips of the arcuate wall sections 56. The portion of the sheet rubber packing which is in contact with the arcuate wall portions 56 is held in place at a plurality of points throughout its surface by rivets 74. An opening is formed through the sheet packing to agree in shape and substantial size with the opening into the throat 54, the portion of the opening of the sheet packing which bounds the openings through the throat 54 being provided with downwardly extending lips 75 which are secured within the throat by cleats 76 and screws 77. In this manner the throat will be sealed against pneumatic pressure. The lower end of the throat casting 55 is fitted with a bolting flange 78 which seats upon a bolting flange 79 of a dispersion chamber 80, said flanges being held together by bolts 81. The dispersion chamber is disposed directly below the throat 54 and is in effect a continuation thereof so that finely divided material, such as mixture of sand or cement, may have an uninterrupted flow into a feed housing 81', which is disposed transversely of and at the lower end of the dispersion chamber 80. The dispersion chamber 80, as particularly shown in Fig. 4 of the drawings, is formed with a laterally extending passageway 82 which projects horizontally from one side wall of the dispersion chamber and is fitted with a dome 83. This dome is hemispherical in shape and for purposes of cleaning is fitted with a removable plug 84 at its end. Extending into the dome and tangentially thereof, is an air inlet pipe 85. This pipe is connected with a suitable source of air under pressure and insures that the air will be given a gyratory motion within the dome, and that it may travel horizontally through the member 82 and into and across the dispersion chamber 80 at a substantially uniform rate of flow. It will thus be seen that a zone will be created within the dispersion chamber in which the air will be violently agitated so that the particles of sand and cement released from the pockets 63 of the rotating valve 41 will fall of their own weight into the zone of agitation and will there be dispersed and mechanically suspended as carried by the air introduced through the pipe 85 and conducted into the feed housing 81'. Here the mechanically suspended particles will be moved longitudinally with the air in which it is suspended as propelled by a feed screw 86 which is mounted upon a shaft 87 extending longitudinally of the feed housing 81'. Attention is directed to the fact that the pitch of the thread of the feed screw is such as to cause a length of screw representing a plurality of flights to be disposed across the lower end of the throat of the dispersion chamber 80. Due to this arrangement the intermittent feed of material from the pockets of the rotary valve 41 will be modulated so that a continuous fluid flow at constant pressure will take place through the conduit 99. The shaft 87 is rotatably supported within a bearing place 88 at one end of the feed housing and is free to rotate within the opposite end of the feed housing, at which end of the shaft there is provided an agitator 89. This member comprises a tip 90 fitting into the end of the shaft 87 and being formed with a plurality of radially and obliquely extending air ducts 91 which communicate with a central passageway 92, at their inner ends, said passageway receiving air under pressure from the tubular passageway formed within the shaft 87. A continuation of the member 90 extends centrally and longitudinally as indicated at 93 from the shaft 87 and carries a plurality of blades 94 which extend radially from the member 93, the outer ends of said blades being uniformly tapered to conform to a frusto-conical coupling 95, which is bolted to the discharge end of the cylindrical housing 81'. The small end of the member 95 is formed with a plurality of lugs 96 carrying I-bolts 97 which engage the flange of a coupling 98. The coupling 98 is tubular and receives the end of a conduit 99 through which the air and finely divided particles of material are delivered to a discharge nozzle 100. This nozzle is characterized by the fact that it has a base portion of large diameter and a reduced nozzle outlet of relatively small diameter. Into the large diameter base portion a supply of water is introduced from a water supply pipe 101 so that the dispersed particles, while still in a state of dispersion, may be thoroughly, uniformly, and individually hydrated prior to the time that they are compacted as forced from the restricted nozzle outlet under the pressure and velocity of the air which is being forced through the conduits. The screw 86 and its shaft 87 are connected with a reducing gear structure generally indicated at 102. This device is driven through a chain 103 which chain is led around a driven sprocket 104 and a driving sprocket 105. The driving sprocket 105 is mounted on a shaft 106 parallel to the shaft 28 and is rotatably supported by the frame 15. This shaft, therefore, drives in direct synchronism with the driven shaft 28 and also the driven shaft 30 of the valve, and by this arrangement it will be seen that the rotary valve 41 and the feed screw 86 will have a definite and fixed driving relationship to each other so that the feed of materials into the feed housing 81 will be at a uniform volume, and so that the materials moved from the feed housing will be expelled at a rate of speed which will cause the solid particles to remain in mechanical suspension and dispersion within the fluid pressure.

A fluid supply shaft 107 is connected by a suitable coupling 108 with the end of the tubular shaft 87 carrying the screw 86. A suitable coupling 109 connects the opposite end of the pipe 107 with an air receiver 110, which is shown in Fig. 1 of the drawings as being supported beneath the frame 15 and adjacent the motor end of the machine. This receiver is in communication with a suitable source of air under pressure. Attention is directed to the fact that on the side of the rotary valve housing 40 and through the wall 46 in the direction of rotation of the rotary valve member 41 a plurality of check vent openings 111 are provided so that the air under pressure which becomes entrapped in the feed pockets 63 of the rotary valve 41 may reach an equilibrium with atmospheric pressure before moving to a point where the pocket is presented to the hopper for filling. Pipes 112 connect with these openings and establish communication from the atmosphere through the wall 46 and the arcuate wall 56.

In operation of the present invention the device is assembled as shown in Fig. 1, after which it may be moved to a position in proximity to the work to be done. It will be seen that the machine is quite compact in construction and that it can be temporarily installed at a point convenient to the work to be done, but relatively remote therefrom, so that there will be no difficulty in hauling materials to the machine, and so that the operators will be removed from the actual construction work and will be unhampered in the operation of the machine. The machine when thus installed is provided with a conduit 99 of appropriate length, the end of said conduit being fitted with the nozzle 100 to which is attached the water hose 101. A suitable valve 101' is provided for the water hose so that when the feed supply through the conduit is interrupted the water supply may also be discontinued. Mixed materials may then be placed within the hopper 47, which hopper is preferably maintained in a substantially filled condition. This material will feed downwardly on top of the rotary valve 41 and will find its way into the pockets 63. Attention is directed to the fact that since the pockets 63 are disposed in tangential alignment with the rotary axis of the valve that they will be more easily filled as is evident from the position indicated by a pocket 63a in Fig. 4. The rotary valve 41 revolves in the direction of the arrow a in Fig. 4 and moves the throat of a filled pocket downwardly where it will be sealed by the packing member 71 as it moves in a position to be embraced by the arcuate wall member 51. As the valve rotates, the pockets 63 will move downwardly and pass beneath their shaft 33 and will assume positions, such as indicated at 63b, at which point they will be in vertical alignment with the throat 54 and will be inverted so that the material within the pocket may readily spill therefrom and fall by gravity through the throat 54, the throat member 55, and the dispersion chamber 80. Attention is directed to the fact that metered quantities of the material will be fed into the throat members 54 and 55 when the pockets successively register with the openings through the throat 54, and by controlling the volume and pressure of air delivered into the dome 83 through the pipe 85 a desired agitation and dispersion of the particles will be created. The pressure of this air has been found to be preferably approximately three atmospheres for properly handling sand and cement used in the making of cement mixtures for building purposes. It will be evident, however, that in handling various other materials the pressure of the air introduced may be desirably varied. The air does not pass directly into the dispersion chamber 80, but gyrates in a path substantially at right angles to the direction of flow of the falling materials, and moves across this path to disperse the particles. The air with the dispersed and suspended particles then moves downwardly into the feed housing 81 which is disposed transversely of the lower end of the dispersion chamber 80. Here the air and suspended matter encounter the feed screw 86 by which its direction of travel is changed and after which the material moves forwardly along the feed housing 81' toward the discharge end 95. By reference to Fig. 4 of the drawings it will be seen that the sectional area of the feed housing 81 bears such a relationship to the area of the dispersion chamber 80 and the flights of the conveying screw as to insure that the air under pressure and the suspended particles carried thereby will not be restricted in their flow as they enter the feed housing, and that they may move freely lengthwise of the housing until reaching the tapered end member 85 where the flow will be accurately and materially restricted, thereby increasing its velocity as it is fed into the conduit 99. Attention is again directed to the fact that due to the area and length of the throat of dispersion chamber 55 and to the pitch of the screw thread 86 the flow of air and suspended particles will be uniform and continuous although the material is introduced into the machine in individual metered quantities consecutively introduced. As the air and the suspended particles pass the tip 90 at the end of the tubular shaft 87, the air and the suspended particles will be acted upon by an additional amount of air introduced through the jet opening 91. These openings extend radially and incline so that their outlets will project jets of air in the general direction of the travel of the main body of air and the suspended particles moving through the feed housing 81'. It will be evident that since the shaft 87 with its tip 90 is rotating continuously the main body of air will be thoroughly and continuously agitated by the jets 91 which jets will also aid in moving the air and the particles forwardly and into the restricted throat formed by the agitator housing 95. The agitator blades 94 carried at the end of the tip 90 will also act to distribute the body of air and the suspended particles passing from the housing 81 into the conduit 99. An air duct 92 extending longitudinally through the agitator 94 and discharging centrally thereof at its forward end also aids in maintaining the body of air in motion and in providing additional pneumatic force acting to transport the materials through the conduit. The dispersed particles of sand and cement delivered from the hopper and fed through the machine as released by the rotary valve 41 will thus be conveyed in a condition of dispersion to the nozzle 100 at which point water will be introduced into the body of material to thoroughly hydrate the individual particles of sand and cement. This hydrating action will be initiated in a relatively large base portion of the nozzle, after which the sand, water and cement will be restricted in their flow and will be forced outwardly from the restricted end of the nozzle to be projected against wall forms upon which the material may be caused to be built up to a desired thickness as the nozzle is placed against the form and the amount of material being accumulated, or it may be introduced into closed forms to fill the same. In either event it has been found that cement mixtures made by the apparatus and the method here disclosed set to produce a more compact mass of uniform texture and with strength in excess of that of cement work made by any other known method or apparatus.

It will thus be seen that by the apparatus here disclosed and the method of handling and treating cementitious mixtures, it is possible to rapidly and continuously produce cement work having uniform texture, as well as uniform and excessive strength, by a device which is decidedly simple in construction and operation, and which may be rapidly and continuously operated and easily controlled to produce the results desired.

While we have shown the preferred form of our invention and have explained a preferred method of operation, it is to be understood that various changes might be made in the steps of the method or the parts of the apparatus without departing from the spirit of the invention as claimed, and it is to be understood further that while we have explained this invention as being particularly adapted for conveying the solid ingredients of a cement mixture, and for hydrating the same, that the structure is also well adapted for the conveying of materials for various purposes with or without bringing about their hydration.

Having thus described our invention, what we claim and desire to secure by Letters Patent is:

1. A device of the character described comprising a hopper, a rotary valve housing therebeneath, a rotary valve element within said valve housing and operating on a horizontal axis, a dispersion chamber beneath the valve housing and in communication therewith to receive material from the rotary valve and to permit it to fall therein by gravity, an air dome having a substantially hemispherical closed outer end disposed at the side of the dispersion chamber and adapted to introduce air under pressure tangentially thereinto and in a general direction at right angles to the path of the falling material whereby a gyratory motion will be given the air to insure that the air will flow through the dispersion chamber at a uniform rate, the dispersion chamber having an unrestricted outlet opening at its lower end, a feed housing disposed transversely of the lower end of the dispersion chamber, and communicating therewith through said unrestricted outlet, and a feed screw extending longitudinally of the feed housing and across said outlet opening to receive and advance the material and associated air moving downwardly from the dispersion chamber to the feed chamber.

2. A device of the character described comprising a hopper in which finely divided material may be placed, a valve housing therein upon which the hopper is mounted, said valve housing being inclined to the vertical so that its mouth will be inclined horizontally, a valve seat within the housing being of semi-cylindrical form, said valve seat being spaced from the wall of the housing, a rotary valve member mounted upon a horizontal axis and being formed with pockets sealed by the valve seat, an outlet throat disposed beneath and in communication with the valve housing and the valve members through the valve seat, the vertical wall of said throat in the direction of rotation of the valve member being substantially in alignment with the rotating axis of the valve, the pockets in the rotary valve having parallel walls, the wall in the direction of rotation of the valve being substantially radial to the rotating axis of the valve, said walls being spaced apart the width of the throat whereby to be in vertical alignment with the walls of the throat when in register therewith, walls providing openings in said valve housing and said valve seat, pipe means disposed in said openings and adapted to establish communication between the valve pockets and the atmosphere, and feed means beneath the throat and in communication therewith to receive the material from the throat.

GUSTAVE EDWARD WESTBERG.
HARRY WESTBERG.